US007266435B2

(12) United States Patent
Wang et al.

(10) Patent No.: US 7,266,435 B2
(45) Date of Patent: Sep. 4, 2007

(54) WIRELESS OPERATION OF A VEHICLE TELEMATICS DEVICE

(75) Inventors: Mingheng Wang, Rochester Hills, MI (US); Edward P. Chrumka, Grosse Pointe Park, MI (US); Christopher L. Oesterling, Troy, MI (US); Chester A. Huber, Grosse Pointe Farms, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/846,237

(22) Filed: May 14, 2004

(65) Prior Publication Data

US 2005/0256615 A1 Nov. 17, 2005

(51) Int. Cl.
*G06F 17/00* (2006.01)

(52) U.S. Cl. ........................................ 701/36; 455/420

(58) Field of Classification Search ..................... None
See application file for complete search history.

(56) References Cited

U.S. PATENT DOCUMENTS

| | | | | |
|---|---|---|---|---|
| 6,028,537 | A * | 2/2000 | Suman et al. | 340/988 |
| 6,560,517 | B2 * | 5/2003 | Matsui | 701/33 |
| 6,693,517 | B2 * | 2/2004 | McCarthy et al. | 340/425.5 |
| 6,748,244 | B2 * | 6/2004 | Odinak | 455/569.2 |
| 6,871,067 | B2 * | 3/2005 | Clark et al. | 455/428 |
| 6,917,801 | B2 * | 7/2005 | Witte et al. | 455/418 |
| 2002/0184062 | A1 * | 12/2002 | Diaz | 705/7 |
| 2003/0103482 | A1 * | 6/2003 | Van Bosch | 370/338 |
| 2003/0139179 | A1 * | 7/2003 | Fuchs et al. | 455/426 |
| 2003/0147534 | A1 * | 8/2003 | Ablay et al. | 380/270 |
| 2004/0142678 | A1 * | 7/2004 | Krasner | 455/404.2 |
| 2004/0264387 | A1 * | 12/2004 | Gibeau | 370/254 |
| 2005/0243779 | A1 * | 11/2005 | Bolz | 370/338 |

FOREIGN PATENT DOCUMENTS

WO WO 2004/019209 * 3/2004

* cited by examiner

*Primary Examiner*—Michael J. Zanelli

(57) ABSTRACT

The invention provides a method, a computer usable medium including a program, and a system for operating a vehicle telematics device. The method includes providing a wireless communications gateway between an input device and the vehicle telematics device. Data is physically entered into the input device. The physically entered data is communicated between the input device and the vehicle telematics device via the wireless communications gateway. A service request is placed to a call center based on the physically entered data.

16 Claims, 4 Drawing Sheets

WIRELESS OPERATION OF A VEHICLE TELEMATICS DEVICE

FIELD OF THE INVENTION

This invention relates generally to wireless communications. More specifically, the invention relates to a strategy for wireless operation of a vehicle telematics device.

BACKGROUND OF THE INVENTION

The opportunity to personalize features in a mobile vehicle is ever increasing as the automobile is being transformed into a communications and entertainment platform as well as a transportation platform. Current projections indicate that some type of telematics unit to provide wireless communication and location-based services will be installed in a majority of automobiles in the near future. These services can be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

Despite the development of these strategies for overcoming ambient cabin noise, speech-based communication between the automobile and user remains imperfect. As such, it would be desirable to provide a strategy for communicating between a vehicle user and a telematics device that overcomes the aforementioned and other disadvantages.

SUMMARY OF THE INVENTION

A first aspect of the present invention provides a method of operating a vehicle telematics device. The method includes providing a wireless communications gateway between an input device and the vehicle telematics device. Data is physically entered into the input device. The physically entered data is communicated between the input device and the vehicle telematics device via the wireless communications gateway. A service request is placed to a call center based on the physically entered data.

A second aspect of the invention provides a computer usable medium including a program for operating a vehicle telematics device. The computer usable medium includes computer readable program code for providing a wireless communications gateway between an input device and the vehicle telematics device; physically entering data into the input device; communicating the physically entered data between the input device and the vehicle telematics device via the wireless communications gateway; and placing a service request to a call center based on the physically entered data.

A third aspect of the invention provides a system for operating a vehicle telematics device. The system includes means for providing a wireless communications gateway between an input device and the vehicle telematics device, physically entering data into the input device, communicating the physically entered data between the input device and the vehicle telematics device via the wireless communications gateway, and placing a service request to a call center based on the physically entered data.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE DRAWINGS

Figure 1:
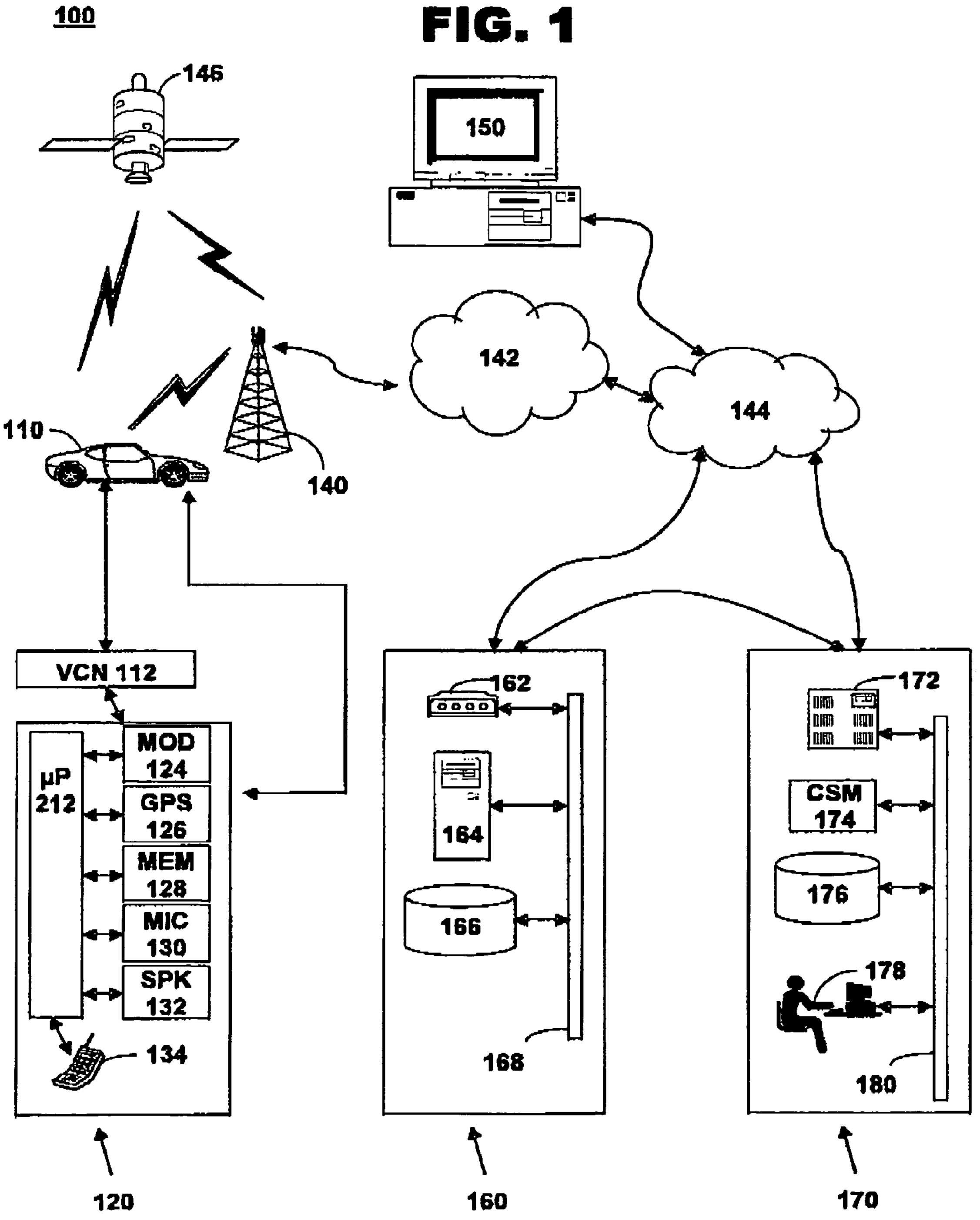
FIG. 1 is a schematic diagram of a mobile vehicle communication system in accordance with one embodiment of the present invention.

FIG. 1 is a schematic diagram of a mobile vehicle communication system in accordance with one embodiment of the present invention and shown generally by numeral 100. Mobile vehicle communication system (MVCS) 100 includes a mobile vehicle conununication unit (MVCU) 110, a vehicle communication network ("VCN") 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment. MVCU 110 is implemented as a mobile vehicle equipped with suitable hardware and software for transmitting and receiving voice and data communications. MVCS 100 can include additional components not relevant to the present discussion. Mobile vehicle communication systems and telematics units are known in the art.

MVCU 110 is also referred to as a mobile vehicle in the discussion below. In operation, MVCU 110 can be implemented as a motor vehicle, a marine vehicle, or as an aircraft. MVCU 110 can include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor ("µP") 122 connected to a wireless modem ("MOD") 124, a global positioning system (GPS) unit 126, an in-vehicle memory ("MEM") 128, a microphone ("MIC") 130, one or more speakers ("SPK") 132, and an embedded or in-vehicle mobile phone 134. In other embodiments, telematics unit 120 can be implemented without one or more of the above listed components, such as, for example, speakers 132. Telematics unit 120 can include additional components not relevant to the present discussion.

In one embodiment, processor 122 is implemented as a microcontroller, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general-purpose processor. In another example, processor 122 is implemented as a digital signal processor (DSP). GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCUs 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 broadcasts over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, data packets received by telematics unit 120 are implemented by processor 122. In another example, data packets received by telematics unit 120 are communicated (see FIG. 2 and discussion, below) to modified MVCUs within the MVCS.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet-browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web servers 164, one or more databases 166, and a network system 168. Web-hosting portal 160 is connected directly by wire to call center 170 or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that are then transferred to web server 164. Modem 162 can reside inside web server 164. Land network 144 transmits data communications between web-hosting portal 160 and call center 170.

Web server 164 receives user-preference data from client computer 150 via land network 144. In alternative embodiments, computer 150 includes a wireless modem to send data to web-hosting portal 160 through a wireless communication network 142 and a land network 144. Data are received by land network 144 and sent to one or more web servers 164. In one embodiment, web server 164 is implemented as any suitable hardware and software capable of providing web services to help change and transmit personal-preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 contains one or more voice and data switches 172, one or more communication services managers ("CSM") 174, one or more communication services databases 176, one or more communication services advisors 178, and one or more network systems 180.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170 and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 provides requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
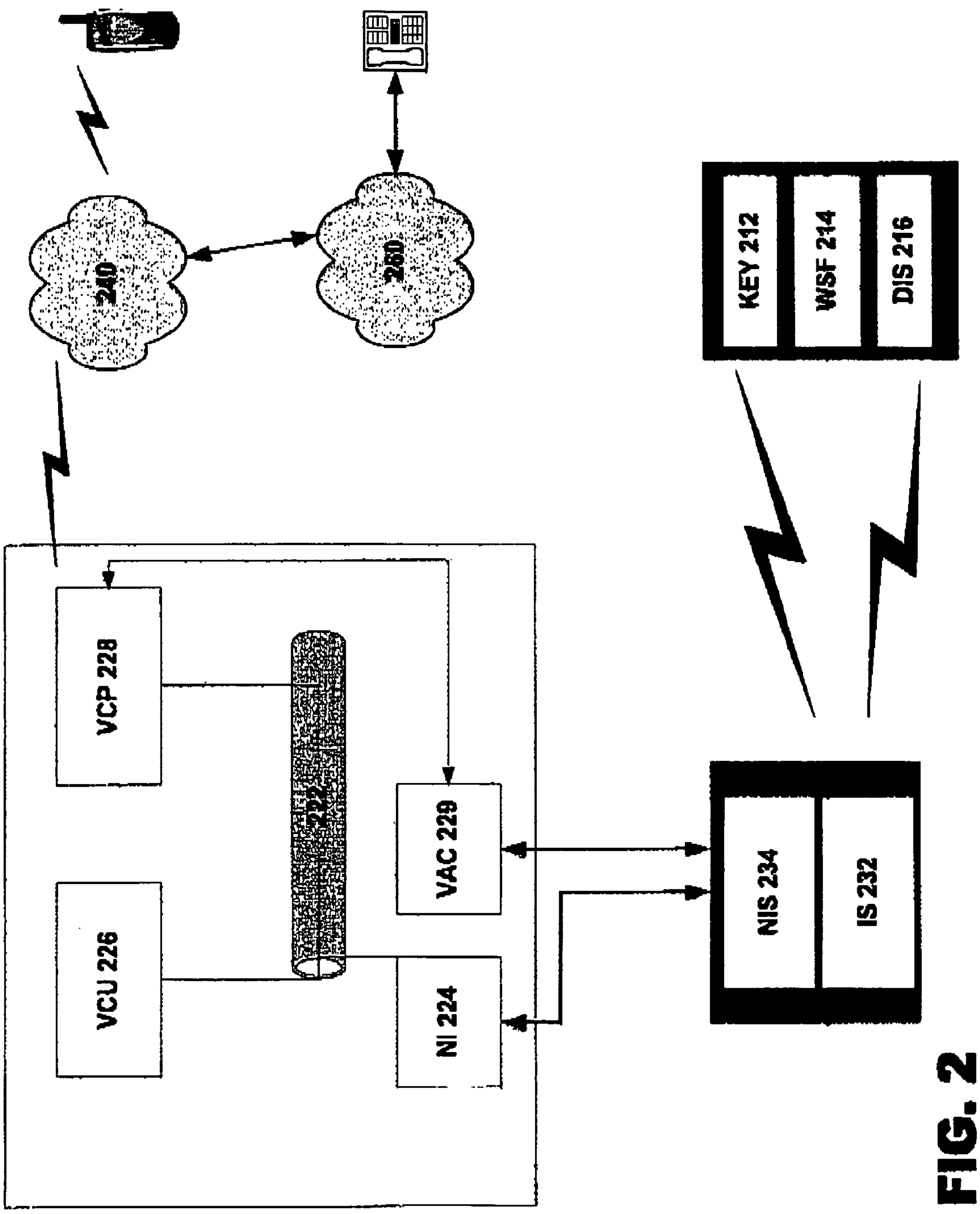
FIG. 2 is a schematic diagram of a telematics-based system in accordance with one embodiment of the present invention.

FIG. 2 is a schematic diagram of a telematics-based system 200 in accordance with one embodiment of the present invention. System 200 includes an input device 210 linked to a vehicle telematics device 220 via a wireless communications gateway 280.

In one embodiment, the input device 210, as discussed in detail below, is, for example, a personal digital device, a wireless device including a keypad, a cellular telephone, a handheld computing device, or another device capable of receiving physical input from a user and wireless transmission of data. Input device 210 includes a keypad ("KEY") 212 or other means of receiving physically entered data, a wireless functionality ("WSF") 214, a display ("DIS") 216, and, optionally, other features. The inventors contemplate that numerous input devices can be adapted for use with the present invention and that the examples provided herein do not limit the scope of the present invention.

In one embodiment, a vehicle interface system 230 interfaces between the input device 210 and the vehicle telematics device 220. In an example, interface system 234) is wirelessly linked to the input device 210 and hard wired to the telematics device 220, thereby acting as an intermediary. Interface system 230 includes interface software ("IS") 232 for performing wireless communication functions with input device 210 (e.g., via one or more communications protocols). Interface system 230 (lather includes data network interface software ("NIS") 234 for performing communications functions with telematics device 220 (e.g., via one or more hardwired networks). Interface software 232 and 234 work in concert to facilitate communication of input device 210 with vehicle telematics device 220.

In one embodiment, the interface system 230 is linked to a vehicle data network 222 of the telematics device 220 through a network interface ("NI") 224. Data network 222 is further linked to a vehicle controller unit ("VCU") 226 and a vehicle communications processor ("VCP") 228 using network interfaces previously described. Controller unit 226 performs pre-defined functions such as unlocking and, optionally, opening doors/trunk/windows, setting personal comfort settings, adjusting electronic and mechanical devices, such as seats, minors, radio, on board computer, etc. Communications processor 228 performs general communication functions (e.g., placing calls, GPS or mapping functions, etc.). Specifically, the communications processor 228 links to a wireless network 240 such as a code division multiple access (CDMA) network, a global system for mobile communications (GSM) network, and the like. The wireless network 240 in turn provides access to cellular communications devices 250. The wireless network 240 provides access to public switched telephone networks (PSTN) 260 or to telephony systems 270. Interface system 230 can be linked directly to the communications processor 228 via a vehicle audio channel ("VAC") 229.

Figure 3:
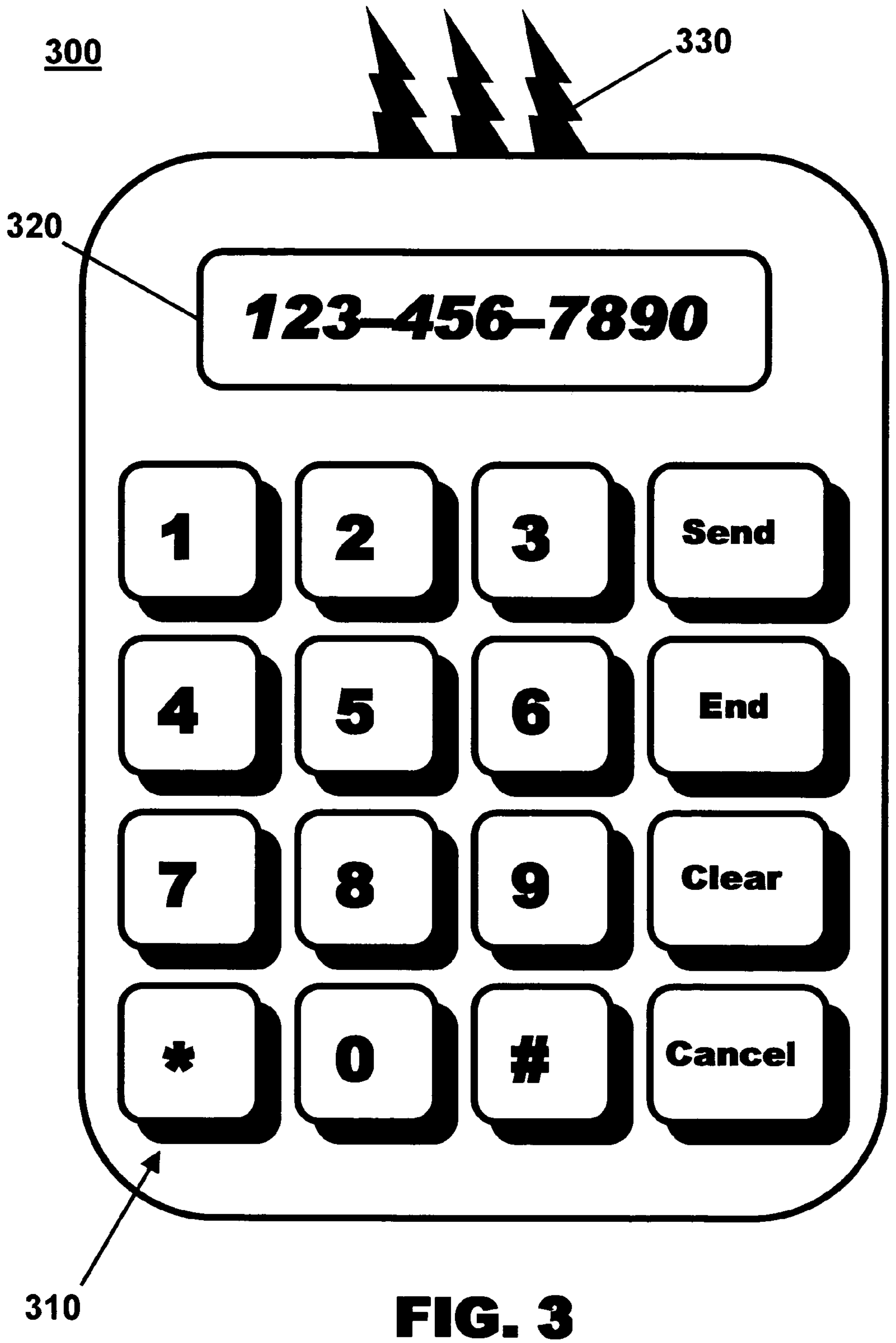
FIG. 3 is a schematic diagram of an input device in accordance with one embodiment of the present invention.

FIG. 3 is a schematic diagram of an input device 300 in accordance with one embodiment of the present invention. Input device 300 is, for example, a personal digital device, a wireless device including a keypad, a cellular telephone, a Pocket PC, or another device capable of receiving physical input from a user and wireless transmission of data. The input device 300 includes one or more keys 310 (including physical keys and/or display "soft" keys) for receiving the physical input and, optionally, a display 320 for providing feedback for the user. Display 320 can also be used to display information received from the vehicle, vehicle telematics device, call center, and the like. Input device 300 also includes means 330 for wirelessly communicating the physically entered data to the vehicle telematics device as known in the art.

In one embodiment, input device 300 includes an intelligent mechanism for mapping keys with an in-vehicle data-messaging sequence and a dual-tone multi-frequency (DTMF) functionality. Each key or key combination can be mapped to a single in-vehicle data message or a sequence of data messages to initiate calls, data transfers, service requests, communications, and the like. This mechanism may be resident in the input device or in the vehicle interface system. The mapped in-vehicle data messages can be used to send dialing digits to the communications processor for initiating voice or data calls via the network interface and data network. Alternatively, the data messages can be used to command the communications processor to send DTMF data to access remote telephony systems (e.g., voice messaging, automatic teller machines, etc.). In this case, the data input is sent through the audio channel whereby DTMF mapping occurs in the communications processor.

Input device 300 further includes embedded software for performing various functions including DTMF functionality, recognition and authorization features by the vehicle interface system and/or call center, and the like. The embedded software, along with an operating system (OS), can be updated using various strategies, including downloading data from the call center or an interface, either physical or wireless, with another device. The communication, storage, and update of embedded software including the OS are known to those skilled in the art.

Figure 4:
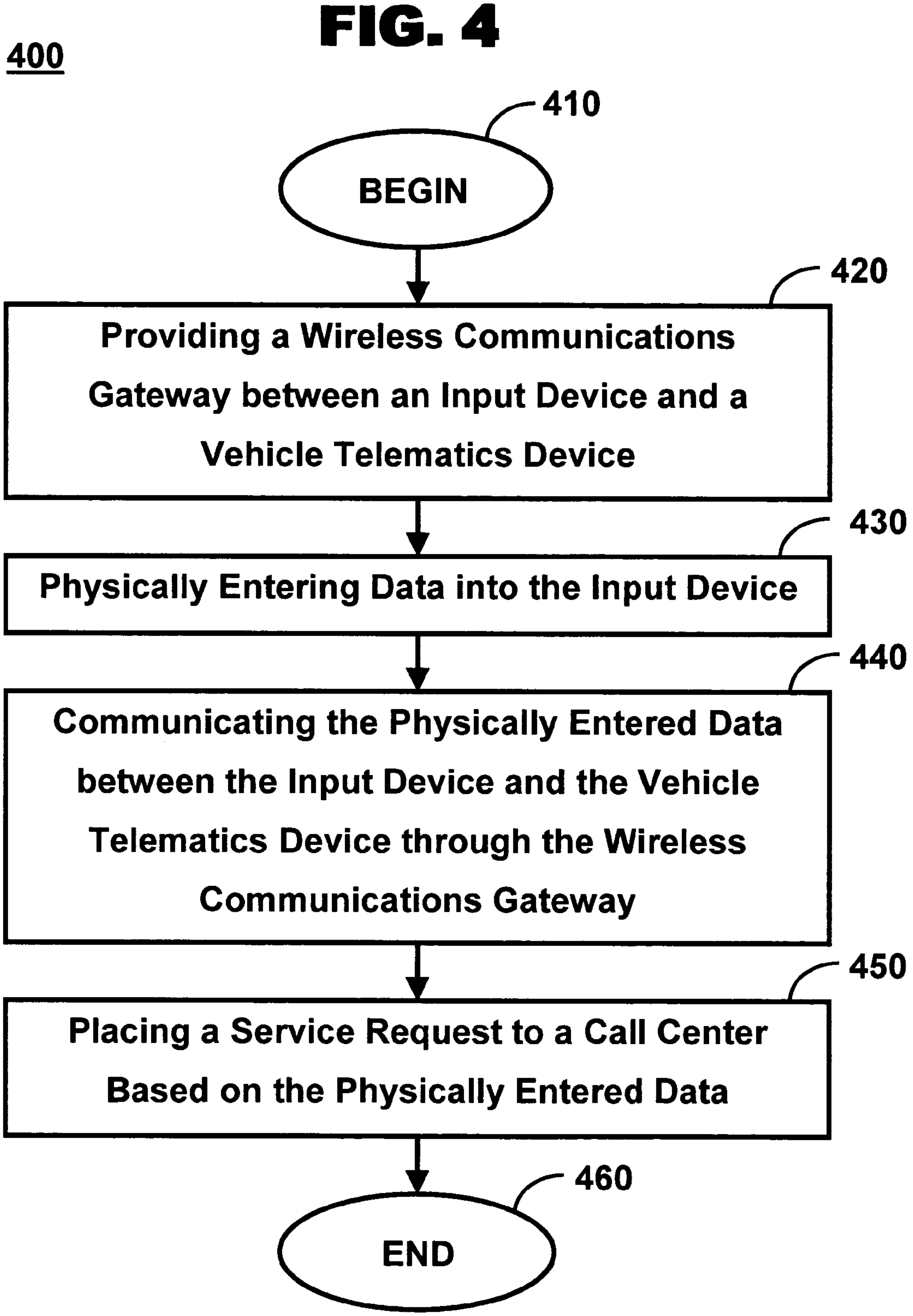
FIG. 4 is a flow diagram of one embodiment of a method of operating a vehicle telematics device, in accordance with one embodiment of the present invention.

FIG. 4 is a flow diagram of one embodiment of a method of operating a vehicle telematics device. In FIG. 4, method 400 utilizes one or more systems and concepts detailed in FIGS. 1, 2, and 3 above. The present invention can also take the form of a computer usable medium including a program for configuring an electronic module within a vehicle. The program stored in the computer usable medium includes computer program code for executing the method steps described in FIG. 4.

In FIG. 4, the method 400 begins at step 410.

At step 420, a wireless communications gateway is provided between an input device and the vehicle telematics device. In one embodiment, the wireless communications gateway comprises one or more communications protocols such as 802.11 series, Bluetooth®), Wi-Fi, direct-sequence spread spectrum (DFSS), frequency-hopping spread spectrum (FHSS), and shared wireless access protocol (SWAP). In another embodiment, the wireless communications gateway comprises another communications protocols.

In one embodiment, the wireless communications gateway is provided between the input device and the telematics unit through the vehicle interface system. In another embodiment, the wireless communications gateway comprises communications between the input device and vehicle telematics device without the vehicle interface system and/or including one or more additional communications components therebetween.

To establish the communications gateway, the input device is detected. In one embodiment, the input device transmits identification information and/or a handshake protocol between the input device and the telematics unit. In one embodiment, an initial authentication process is performed prior to a first usage of the gateway, and a paring process is performed to ensure that the handheld device is properly authenticated to operate the gateway. The identification information transmitted can be authenticated by the telematics unit and/or by the call center to prevent unauthorized communications. Such identification and handshake strategies can be implemented by those skilled in the art. In another embodiment, the wireless communications gateway comprises another communications protocol between the input device and vehicle telematics device, optionally including one or more components there between.

At step 430, data is physically entered into the input device. The input device is, for example, a personal digital device, a wireless device including a keypad, a cellular telephone, and a Pocket PC. In one embodiment, a user manually (i.e., by hand) enters one or more key inputs into the input device. The use of manual input in lieu of voice recognition overcomes the problem of ambient vehicle noise levels, thereby allowing for improved communication between the user and the telematics unit. In another embodiment, the user physically enters the key inputs into the input device using other body movements (e.g., head, foot, arm, etc.). Those skilled in the art will recognize that numerous physical movements can be used to physically enter data into the input device in an unambiguous fashion and fall within the scope of the present invention.

At step 440, the entered data is communicated between the input device 210 and the vehicle telematics device 220 via the wireless communications gateway. The communicated data can be encoded and decoded by the input device and telematics unit using one or more encryption protocol(s). Encryption protocols for maintaining the integrity of the communicated data can be implemented by one skilled in the art. For example, a wired equivalent privacy (WEP) data encryption protocol defined by the 802.11 standard can be implemented to prevent access to the network by those using similar wireless LAN equipment. A set of respective "keys" (e.g., 40-bit, 64-bit, 128-bit, etc.) is defined for the wireless communications gateway based on a key string passed through a WEP encryption algorithm. The WEP protocol general denies access to the communicated data by anyone not having assigned key.

At step 450, a service request is placed to a call center based on the physically entered data. The physically entered data communicated between the input device and the vehicle telematics device can be further communicated to the call center as described above for placing the service request. The user may request one or more of the following: a subscription modification (e.g., a change in the number of minutes or in other features associated with the telematics device or input device); map information (for download onto the telematics device or input device); direction information (for download onto the telematics device or input device); call placement (including access to voice mail/messaging services and text messaging); non-emergency assistance; emergency assistance; various vehicle functions such as performing a pre-defined function (e.g., unlocking and, optionally, opening doors/trunk/windows, setting personal comfort settings, adjusting electronic and mechanical devices, such as seats, mirrors, radio, on board computer, etc.); a communication function (e.g., placing calls, modifying GPS or mapping functions, etc.); or other information or services. The inventors contemplate numerous requests being placed to the call center via the input device, such requests not limited to the examples provided herein.

At step 460, the method terminates.

The above-described methods and implementation for operating an input device and a vehicle telematics device through a wireless communication gateway are example methods and implementations. These methods and implementations illustrate possible approaches for operating a vehicle telematics device as a communication gateway. The actual implementation may vary from the method discussed. Moreover, various other improvements and modifications to this invention may occur to those skilled in the art, and those improvements and modifications will fall within the scope of this invention as set forth in the claims below.

The present invention can be embodied in other specific forms without departing from its spirit or essential characteristics. The described embodiments are to be considered in all respects only as illustrative and not restrictive.

The invention claimed is:

1. A method of operating a vehicle telematics device, the method comprising:

providing a wireless communications gateway between an input device and the vehicle telematics device;

physically entering data into the input device via one or more keys on the input device, wherein individual keys or key combinations of the input device are mapped to at least one in-vehicle data message;

generating from the entered data a mapped in-vehicle data message for placing a call;

communicating the mapped in-vehicle data message from the input device to the vehicle telematics device via the wireless communications gateway; and placing the call from the vehicle telematics device based on the mapped in-vehicle data message.

2. The method of claim 1 wherein the wireless communications gateway comprises a communications protocol.

3. The method of claim 2 wherein the communication protocol is selected from a group consisting of: 802.11 series, Bluetooth, Wi-Fi, direct-sequence spread spectrum, frequency-hopping spread spectrum, and shared wireless access protocol.

4. The method of claim 1 wherein the input device is selected from a group consisting of: a personal digital device, a wireless device including a keypad, a cellular telephone, and a handheld computing device.

5. The method of claim 1 wherein communicating the physically entered data comprises encoding communicated data.

6. The method of claim 1 further comprising detecting the input device.

7. The method of claim 6 wherein detecting the input device comprises transmitting at least one of identification information and a handshake protocol between the input device and the vehicle telematics device.

8. A method of operating a vehicle telematics device using a portable wireless device, the method comprising the steps of:

physically entering data into a portable wireless device;

creating a data message using the data, the data message being capable of commanding the vehicle telematics device to place a call using dialing digits contained in the data message;

establishing a wireless data connection between the portable wireless device and the vehicle telematics device;

sending the data message from the portable wireless device to the vehicle telematics device via the wireless data connection and, in response thereto;

placing a call over a wireless carrier system from the vehicle telematics unit using the dialing digits received in the data message.

9. The method of claim 8 wherein the call is selected from a group consisting of: data transfers and service requests.

10. The method of claim 8 wherein the step of sending the data message further comprises sending dialing digits to the telematics device for initiating voice calls via a network interface.

11. The method of claim 8 wherein the data message is DTMF data for accessing remote telephony systems.

12. The method of claim 11 wherein the data message is sent through an audio channel that maps DTMF signals.

13. The method of claim 8 wherein the wireless data connection is selected from a group consisting of: 802.11 series, Bluetooth, Wi-Fi, direct-sequence spread spectrum, frequency-hopping spread spectrum, and shared wireless access protocol.

14. The method of claim 8 wherein the portable wireless device performs an authentication process where identification information is exchanged between the portable wireless device and the vehicle telematics device.

15. The method of claim 8 wherein the wireless data connection uses a wired-equivalent privacy data encryption protocol to control access to the vehicle telematics device.

16. A method of operating a vehicle telematics device using a portable wireless device, the method comprising the steps of:

establishing a wireless data connection between a portable wireless device and a vehicle telematics device;

placing a call over a wireless carrier system from the vehicle telematics device;

communicating with a remote telephony system via the call; and accessing the remote telephony system using keys on the portable wireless device, wherein the accessing step further comprises the following steps:

generating a data message using data physically inputted into the portable wireless device via keys on the portable wireless device;

sending the data message to the vehicle telematics device over the wireless data connection; and sending DTMF data from the vehicle telematics device to the remote telephony system in accordance with the data message received from the portable wireless device.

* * * * *